(12) United States Patent
Hierzer

(10) Patent No.: US 7,940,191 B2
(45) Date of Patent: May 10, 2011

(54) MOVEMENT CONTROLLED LUMINAIRE AND LUMINAIRE ARRANGEMENT

(76) Inventor: Andreas Hierzer, Graz (AT)

( * ) Notice: Subject to any disclaimer, the term of this patent is extended or adjusted under 35 U.S.C. 154(b) by 385 days.

(21) Appl. No.: 12/034,309

(22) Filed: Feb. 20, 2008

(65) Prior Publication Data

US 2009/0091444 A1    Apr. 9, 2009

(30) Foreign Application Priority Data

Oct. 3, 2007 (AT) .................................. 1560/2007

(51) Int. Cl.
*G08B 5/22* (2006.01)

(52) U.S. Cl. ............. 340/815.45; 340/815.4; 340/540; 340/332; 362/125

(58) Field of Classification Search ............. 340/815.45, 340/541, 815.4, 815.73, 815.74, 332, 565, 340/500; 362/125, 458
See application file for complete search history.

(56) References Cited

U.S. PATENT DOCUMENTS

| | | | |
|---|---|---|---|
| 5,136,213 A * | 8/1992 | Sacchetti ..................... 340/541 |
| 6,250,774 B1 * | 6/2001 | Begemann et al. ........... 362/231 |
| 7,102,172 B2 * | 9/2006 | Lynch et al. ..................... 257/79 |
| 7,205,903 B2 * | 4/2007 | Blum et al. ................. 340/815.4 |
| 7,339,471 B1 * | 3/2008 | Chan et al. ..................... 340/541 |
| 7,571,063 B2 * | 8/2009 | Howell et al. ..................... 702/60 |
| 2003/0115096 A1 * | 6/2003 | Reynolds et al. ................. 705/14 |
| 2004/0036603 A1 * | 2/2004 | Bingham ....................... 340/541 |
| 2005/0151489 A1 * | 7/2005 | Lys et al. ....................... 315/308 |
| 2005/0259416 A1 * | 11/2005 | Gauna et al. ................... 362/227 |
| 2007/0171647 A1 * | 7/2007 | Artwohl et al. ................. 362/276 |
| 2008/0203275 A1 * | 8/2008 | Kosters ......................... 250/205 |
| 2009/0086488 A1 * | 4/2009 | Lynch et al. ............... 362/249.02 |
| 2009/0171788 A1 * | 7/2009 | Tropper et al. ................. 705/14 |

\* cited by examiner

*Primary Examiner* — Eric M Blount
(74) *Attorney, Agent, or Firm* — Workman Nydegger

(57) ABSTRACT

A luminaire includes at least one main illuminant and at least one auxiliary illuminant. The main illuminant is provided for a continuous operation. The auxiliary illuminant is controlled by a motion sensor, which activates it when movement is detected. Preferably, the motion sensor is embedded in the luminaire. Furthermore, it is preferred that the at least one auxiliary illuminant is designed as a LED-luminaire.

22 Claims, 2 Drawing Sheets

MOVEMENT CONTROLLED LUMINAIRE AND LUMINAIRE ARRANGEMENT

Figure 1:
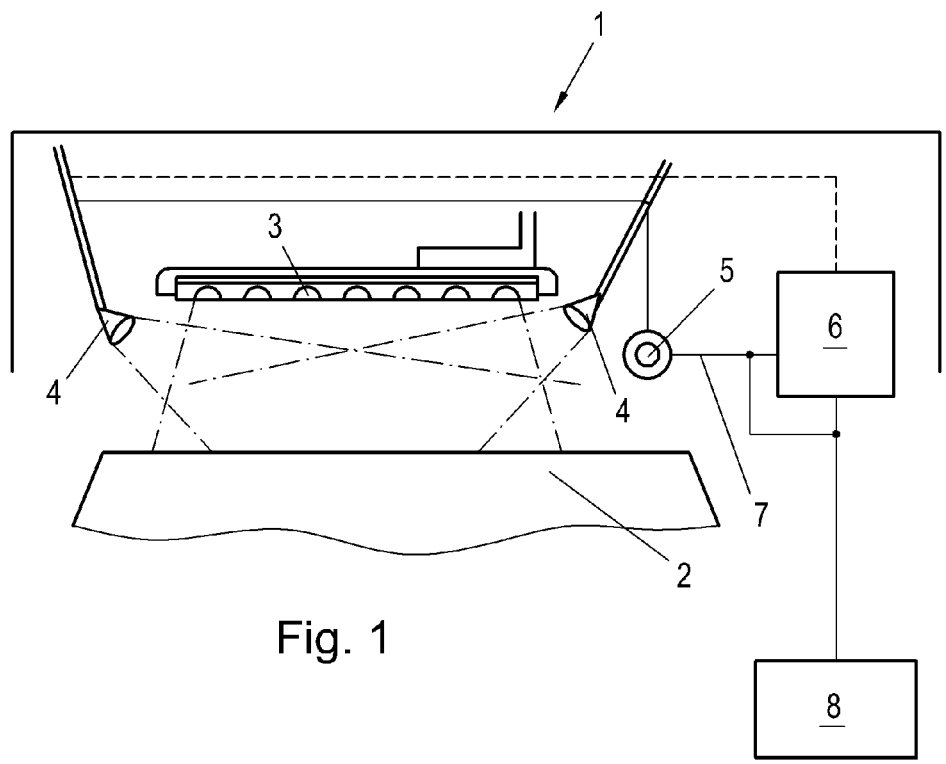

The invention is based on a luminaire comprising at least one main illuminant and at least one auxiliary illuminant.

For reasons of environmental protection, sales areas and goods displays in some countries have meanwhile been subjected to restrictions with regard to the average power consumption for lighting per unit of area. The result is that it has to be accepted in many cases that cuts must be made in the presentation of goods in that illuminants which provide intense lighting but, at the same time, have high power consumption must be dispensed with and goods suppliers proceed to a relatively weak illumination of sales areas. However, poorly lighted sales areas are known to reduce the advertising appeal of the goods presentation and also affect customers when they are choosing goods.

It is thus an object of the invention to indicate a luminaire which, on the one hand, provides a satisfactory illumination of sales areas for the customer and, on the other hand, meets the standards for a maximum lighting amperage of sales areas.

Said object is achieved by a luminaire having the features of claim 1. Advantageous embodiments of the invention are set forth in the dependent claims.

The luminaire according to the invention comprises at least one main illuminant, e.g., a halogen luminaire or LED, and at least one auxiliary illuminant as well as at least one motion sensor. The motion sensor activates the at least one auxiliary illuminant when a movement is detected. Thus, the auxiliary illuminant is in operation when customers are present in the ambient area of the luminaire, but is switched off when the customers leave said ambient area. As a result, higher power consumption may indeed occur temporarily when the auxiliary illuminant is switched on, but the average power consumption is decreased since periods in which the auxiliary illuminant is switched off will also occur again and again. The motion sensor is preferably embedded in the luminaire which thus can be supplied and installed as a unit.

Thus, the invention ensures that sales areas or goods displays can always be illuminated satisfactorily as long as customers and onlookers are present in the area but the maximum allowed average lighting amperage is not exceeded.

According to a further embodiment, the motion sensor may also be designed as a video or thermal imaging camera. Alternatively, the at least one motion sensor may be designed in the form of a light barrier, with a plurality of light barriers preferably being provided whose light beams form a light grid.

The at least one auxiliary illuminant is preferably designed as a LED-luminaire. LED-luminaires are characterized by a high luminous efficacy with a favourable energy consumption.

In a further embodiment of the invention, the motion sensor is designed such that it will deactivate the at least one auxiliary illuminant by itself when it detects no movement. Optionally, this may happen after the expiry of a waiting period in order to render the switch-off process largely unnoticeable to the customer.

So as to keep the motion sensor separate from the supply voltage and the currents of the auxiliary illuminants, the motion sensor may be coupled to the at least one auxiliary illuminant via a control device. In said embodiment, the deactivation of the auxiliary illuminant may furthermore be triggered directly by the control device after the expiry of a time period—calculated from the last motion detection by the motion sensor.

Large constructive and design freedoms with regard to the arrangement of the motion sensor and the control device are achieved if a wireless connection exists between the motion sensor and the control device, since no lines have to be laid.

In a multifunctional and therefore particularly useful embodiment of the luminaire according to the invention, the motion sensor and/or the control device is/are connected to a control computer via a data bus. Using said embodiment, it is possible to transmit data about the operating times or about the switch-on and switch-off times of the at least one auxiliary illuminant or signals of the motion sensor to the control computer. Suitable communications protocols for the data transfer in the data bus are DMX, Bluetooth or the like. The motion signals detected by the motion sensor and forwarded to the control unit and the switch-on and switch-off signals of the auxiliary illuminants derived therefrom, respectively, are thus collectable, storable and evaluable in the control computer, whereby the behaviour of persons present in the area of the luminaire according to the invention is analyzable in a simple manner. Suitable memory modules are, in particular, EPROMs or EEPROMs.

Furthermore, it can advantageously be provided that the at least one main illuminant and/or the at least one auxiliary illuminant is/are designed as an illuminant variable in colour, wherein a change in colour can be activated by the motion sensor, which clearly improves the creativity and flexibility with regard to the effects to be achieved.

The programming and reproducing of sequences of operations such as dimming, a change in intensity, a change in colour, a delay in switching on and/or switching off the main and/or auxiliary illuminants may be used in an advantageous manner for accentuating certain goods or presentation areas.

By operating the at least one main illuminant in a continuous operation with a selectable basic illuminance, it is made sure that the customer can see the presentation areas and goods and can move specifically toward them.

The design of the at least one auxiliary illuminant as a so-called master illuminant connected to at least one further illuminant which is designed as a slave illuminant and can be activated by the at least one master illuminant produces artful lighting effects also in small and/or hidden presentation areas. Cabling may optionally be omitted because of the use of photocells for activating the slave illuminants.

A further important aspect of the present invention is that a luminaire assembly comprising several luminaires according to the invention is provided, which serves for guiding persons within a predetermined area. Said area may, for example, be a sales area. The luminaire assembly according to the invention comprises at least two luminaires and a control computer, with the control computer continuously detecting persons by means of the motion sensors of the luminaires and activating or deactivating auxiliary illuminants and optionally also main illuminants of luminaires based on their movement behaviour. The detected movement behaviour of persons comprises at least one from the moving direction, the speed, the staying time and/or the orientation of the visual field. By activating/deactivating luminaires selectively along a path through an area covered by motion sensors, the persons are offered "guide suggestions" they may or may not respond to at their own discretion.

Figure 3:
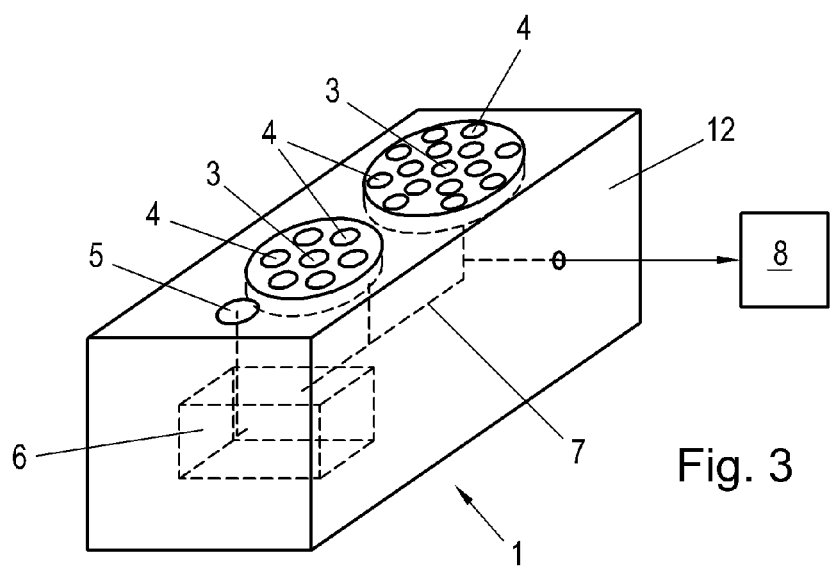
Figure 2:
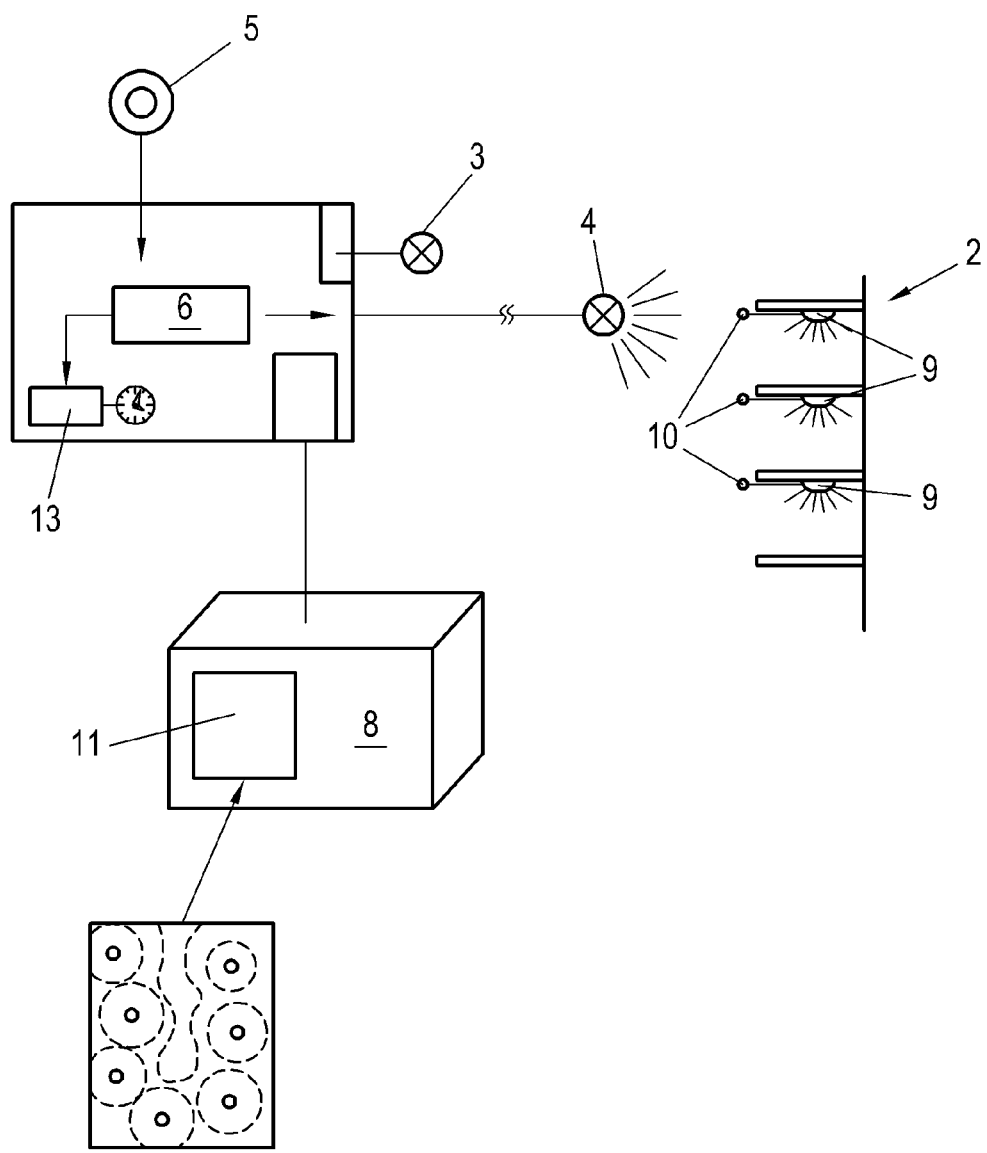

Below, the invention is described in further detail with reference to preferred exemplary embodiments in the figures. In said figures:

FIG. 1 shows a schematized illustration of a luminaire designed according to the invention, FIG. 2 shows a more detailed schematized illustration of the circuitry of the luminaire according to the invention, and FIG. 3 shows a schematic exemplary embodiment of a luminaire designed according to the invention.

The luminaire 1, which is illustrated in a highly schematized form in FIG. 1, serves for the illumination of a presentation area 2. In the exemplary embodiment, the luminaire 1 comprises an elongate main illuminant 3 designed, for example, as a series of halogen or LED-luminaires, as well as two auxiliary illuminants 4 arranged at the side thereof, which are designed as LED-luminaires. The main illuminant 3 emits a constant light which may remain switched on permanently since it is clearly below a maximum allowed power value, thereby illuminating the presentation area 2. The illuminance of the permanent basic illumination may be dimmed, for example, approx. 20% of the total illuminance is adjusted. The main and auxiliary illuminants 3, 4 may be arranged and installed in a random manner which is basically known. The light cones of the respective illuminants are indicated in the drawing.

An advantage resulting from the exemplary arrangement according to the invention as per FIG. 1 is the fact that high strain on the main illuminants 3 due to frequent switching on and off is prevented.

The number and type of the main and auxiliary illuminants 3, 4 used may be adapted to the respective conditions by using more or less main and auxiliary illuminants 3, 4 as well as different types of illuminants.

According to the invention, the auxiliary illuminants 4 are connected to a motion sensor 5, which is designed separately in the exemplary embodiment illustrated in FIG. 1, but may also be embedded in the luminaire 1, as exemplified in FIG. 3. The motion sensor 5 registers movements in its field of vision and forwards the detected signals to a control unit 6 which will then activate the auxiliary illuminants 4, keeping them activated for a predetermined period calculated from the occurrence of the in each case last signal of the motion sensor 5 in order to switch them off subsequently. Alternatively, the motion sensor 5 itself could also be designed for activating the auxiliary illuminants 4 upon detection of a movement and, if no more movement is detected, for deactivating them after an adjustable holding time. Thus, if a person steps in front of a goods presentation area 2, the person's movement is registered by the motion sensor 5 and the additional illumination in the form of the auxiliary illuminants 4 is switched on so that the person in front of the presentation area 2 is able to view said area. The auxiliary illuminants 4 remain active as long as the person stays in front of the presentation area 2, since his or her movements continue to be detected by the motion sensor 5. If the person leaves the area covered by the motion sensor 5, the auxiliary illuminants 4 will go out after a selectable time period. The sensitivity of the motion sensor 5 can be chosen appropriately in order to be able to detect movements within a certain radius, thus adjusting the illumination when a person is approaching.

In the illustrated luminaire 1 according to the invention, the motion sensor 5 and the control device 6 may be interconnected in a wireless fashion or by cables. The motion sensor 5 may, in particular, also be designed in the form of a video and/or thermal imaging camera or may be coupled to such a camera in order to permit more precise analyses of the customer flow.

Furthermore, the motion sensor 5 and the control device 6 may be connected to a control computer 8 via a data bus 7, with the motion sensor 5 and the control device 6 also communicating with each other via said data bus. With the aid of the data bus connection to the control computer 8, acquisition, storage and evaluation of data is feasible. The storage of data may, for example, occur in memory modules 13 such as EPROMS or EEPROMS. Using an appropriate software, the control computer 8 can perform evaluations about the number of persons in front of the presentation area 2, their staying time in front of the presentation area 2 etc. based on the received signals over a selectable time period and is thus able to give information about buying behaviour and interest via a customer flow analysis. Particularly, the illumination times determined by recording the switch-on and switch-off times of the auxiliary illuminants 4 as well as the switching frequency, the signals of the motion sensor 5 and/or the images taken by the video or thermal imaging camera are suitable for the evaluation.

As illustrated in FIG. 2 in more detail, the evaluations can be displayed on a suitable output device such as, e.g., on a screen 11. For example, it can be shown which luminaires 1 are active, how distributions of light intensity change, where customers are present and along which paths they move.

As is indicated in a highly schematized form on the right-hand side of FIG. 2, it is possible, in addition, to design the auxiliary illuminants 4 as so-called masters and to attach further illuminants 9 as so-called slaves in appropriate places of the presentation area 2 (in this case a shelf), which slaves are, for example, equipped with photocells 10. If light falls from the auxiliary illuminants 4 onto the photocells 10 of the further illuminants 9, those are activated as well. The slaves may thereby be arranged on any desired number of planes, which, in each case, react to an incidence of light from the respective master light source, whereby creative and efficient illuminations can be made possible.

As was already addressed above, the luminaires 1 according to the invention may be designed such that all essential components—main illuminants 3, auxiliary illuminants 4, motion sensor 5 and control device 6—are arranged in a common casing 12, as is shown schematically in FIG. 3. For example, two assemblies of LEDs may be provided in the casing 12, wherein one is gatable as the main illuminant 4, whereas the further LEDs are connected as the auxiliary illuminants 4.

In said exemplary embodiment, the control device 6 is likewise arranged in the casing 12 and is connected to the control computer 8 via the data bus 7. The casing 12 may be designed appropriately so as to be suitable for installation or foundation and, for example, so as to be flush with a surface such as a wall or a portion of the presentation area 2.

Adequate programming of the control device 6 enables that at least one main illuminant 3 and/or the at least one auxiliary illuminant 4 is/are operated in at least one selectable sequence, wherein said sequence may comprise one or several operations such as dimming, variations in the intensity of the illuminants 3 and 4, changes in the colour of the appropriately designed illuminants 3 and 4 as well as delays in switching on and/or switching off the illuminants 3 and 4.

The luminaires 1 described can advantageously be operated in a luminaire assembly, which comprises at least two, advantageously, however, a plurality of luminaires 1 and a control computer 8. The control computer continuously detects persons by means of the motion sensors 5 of the luminaires 1 and, based on their movement behaviour, activates/deactivates auxiliary illuminants 4 and optionally also main illuminants 3 of luminaires 1.

Based on the detected presence of persons and their movement behaviour, said luminaire assembly serves the purpose of "guiding" said persons by means of the luminaires 1. The controlled variable is thereby the movement behaviour which does not only comprise the position of the persons but also the moving direction, the speed, the staying time and/or the orientation of the visual field. The luminaires 1 may advantageously be arranged in lighted presentation units for goods etc. If a person steps into an area covered by the motion sensors 5 such as, e.g., a sales area, this is detected by the motion sensors 5 and his or her presence is reported to the control computer 8. The person is continuously detected with regard to his or her movement through the sales area and smaller sales units (e.g. showcases) are specifically illuminated depending on his or her movement in the covered area. Thereby, it becomes possible, for example, to "guide" a customer specifically through a sales area by means of light. If, for example, a person steps into a sales area and shows interest in a product A through his or her movement, on the one hand, the showcase in which the product A is located is illuminated and, subsequently, showcases or areas containing products similar to "A" (the same genre) are illuminated as a "guide suggestion". Of course, it is not only possible to guide the customer "through" the portfolio of product class "A", but, rather, a selective light guidance through the entire sales area is possible. Because of the more complex, redundant design of the system of the luminaire assembly, a simultaneous, unaffected light guidance of several customers is also possible. A byproduct of said invention is the presence of an abundance of statistically analyzable data pertaining to the flow of persons. (When did how many customers step into the sales area? Where did they go first, where did they stay for how long? How many persons follow the light guide suggestion for how long?)

In a first embodiment of the luminaire assembly according to the invention, it is provided that infrared cameras are used as motion sensors which provide a better detection behaviour as compared to conventional RGB cameras and therefore permit an error-minimized operation.

In a first variant, two infrared cameras, for example, cover the area to be monitored. By aligning the two camera angles (aligning the transmitted video streams) it is possible to perform a 3-dimensional determination of the person's position. By appropriate routines implemented in the control software, it is also possible to distinguish between articles associated to persons. For example, the software running in the control computer 8 efficiently screens out articles (e.g. showcases, clothes racks/window dummies and similar lifeless articles) by, on the one hand, monitoring the temperature of the articles and, on the other hand, comparing their cubature (3-dimensional shape) to the set values of a person to be guided. If the software has identified a person from the live-stream images, the implemented guiding operation starts, wherein the person's behaviour is always monitored and responded to through the images. The person is regarded as finalized for the control only when he or she has left the sales area or stays in an area for which no light arrangement is provided (e.g. changing cubicle/cash desk/vestibule).

In a second variant, the sales area is furnished with a "grid" of motion sensors 5, e.g., with laser barriers or infrared grids. If a person steps into said grid, the information on his or her x-y position resulting therefrom is sent to the control computer 8. The recognition algorithm described in the first variant can likewise be performed based on said information, combined with the 2-dimensional data from at least one infrared camera.

Once the person to be guided has been detected by one of the two above-described variants, he or she is marked as an "identified object" and the light control suggests a guided path through the sales area. Of course, the person is free to "deviate" from said suggested route (e.g., to walk back one meter) at any time and will, of course, still receive the full illumination in the area of his or her angle of vision.

What is claimed is:

1. A luminaire, comprising:
   at least one main illuminant and at least one auxiliary illuminant, wherein at least one motion sensor activates the at least one auxiliary illuminant when a movement is detected, wherein:
   the at least one auxiliary illuminant is designed as a master illuminant;
   at least one further illuminant is provided which can be activated as a slave illuminant by the master illuminant; and
   the at least one further illuminant is effected by means of at least one photocell connected to the further illuminant.

2. The luminaire according to claim 1, wherein the motion sensor is embedded in the luminaire.

3. The luminaire according to claim 1, wherein the at least one motion sensor is designed in the form of a video or thermal imaging camera.

4. The luminaire according to claim 1, wherein the at least one motion sensor is designed in the form of a light barrier, with a plurality of light barriers preferably being provided whose light beams form a light grid.

5. The luminaire according to claim 1, wherein the at least one auxiliary illuminant is designed as a LED-luminaire.

6. The luminaire according to claim 1, wherein the at least one auxiliary illuminant is deactivated by the motion sensor when it detects no movement, optionally after the expiry of a time period.

7. The luminaire according to claim 1, wherein the motion sensor is coupled to the at least one auxiliary illuminant via a control device.

8. The luminaire according to claim 7, wherein the control device deactivates the at least one auxiliary illuminant after the expiry of a time period—calculated from the last motion detection by the motion sensor.

9. The luminaire according to claim 7, wherein a wireless connection exists between the motion sensor and the control device.

10. The luminaire according to claim 1, wherein the motion sensor and/or the control device is/are connected to a control computer via a data bus.

11. The luminaire according to claim 10, wherein the protocol transmitting the data via the data bus is DMX, Bluetooth or a similar protocol.

12. The luminaire according to claim 10, wherein data about the operating times and/or the switch-on and switch-off times of the at least one auxiliary illuminant and/or signals of the motion sensor are transmittable to the control computer and are storable therein in a memory module.

13. The luminaire according to claim 10, wherein the data about the operating times and/or the switch-on and switch-off times of the at least one auxiliary illuminant and/or the signals of the motion sensor and/or the images taken by the video or thermal imaging camera are evaluable using programs and are displayable on an output device.

14. The luminaire according to claim 1, wherein the at least one main illuminant and/or the at least one auxiliary illuminant is/are designed as an illuminant variable in colour, wherein a change in colour can be activated by the motion sensor.

15. The luminaire according to claim 1, wherein the at least one main illuminant and/or the at least one auxiliary illuminant is/are operable in at least one selectable sequence.

16. The luminaire according to claim 15, wherein the at least one sequence comprises one or several of the following operations:

dimming, a change in intensity, a change in colour, a delay in switching on and/or switching off.

17. The luminaire according to claim 1, wherein the at least one main illuminant is operable in a continuous operation with a selectable basic illuminance.

18. The luminaire assembly comprising at least two luminaires according to claim 1, wherein a control computer is designed for continuously detecting persons by means of the motion sensors of the luminaires and for activating or deactivating auxiliary illuminants and main illuminants of luminaires based on their movement behaviour.

19. The luminaire assembly according to claim 18, wherein the movement behaviour of persons comprises at least one from the moving direction, the speed, the staying time and/or the orientation of the visual field.

20. The luminaire assembly according to claim 18, wherein the control computer is designed for guiding persons along a path through an area covered by motion sensors by activating/deactivating luminaires.

21. The luminaire according to claim 1, wherein the at least one main illuminant comprises one of: a halogen luminaire or an LED luminaire.

22. The luminaire of claim 10, wherein the data bus comprises a LAN, wherein a memory module comprises an EPROM or an EEPROM, and wherein the output device comprises a screen of the control computer.

* * * * *